United States Patent Office 3,214,291
Patented Oct. 26, 1965

3,214,291
POLYVINYL ALCOHOL FILM COATED WITH VINYLIDENE CHLORIDE-ACRYLONITRILE COPOLYMER
Daniel S. Dixler, Berkeley Heights, N.J., assignor to Air Reduction Company, Incorporated, New York, N.Y., a corporation of New York
No Drawing. Filed Feb. 15, 1962, Ser. No. 173,361
18 Claims. (Cl. 117—138.8)

This invention relates to transparent packaging films and, more particularly, to coated films having a polyvinyl alcohol base and a coating consisting essentially of a vinylidene chloride-acrylonitrile copolymer.

A number of coated transparent film compositions have been previously described in the art for use as packaging films. While some of these films are reported to have low permeability to oxygen, the permeability nevertheless is not low enough to permit storage of perishable foods for long periods of time. For example, various food products such as ground meat, luncheon meat and cheese, deteriorate in a comparatively short period of time when wrapped in presently known coated plastic films.

An object of this invention is to provide a coated transparent plastic film having extremely low oxygen permeability.

Another object of this invention is to provide a packaging film having as its base polyvinyl alcohol of low oxygen permeability.

A further object of this invention is to provide an adherent coating of a vinylidene chloride-acrylonitrile copolymer on a polyvinyl alcohol base.

These and other objects will be apparent from the specification.

The packaging film compositions of this invention comprise a thin flexible base layer of polyvinyl alcohol coated with a vinylidene chloride-acrylonitrile copolymer containing about 70 to 95% by weight of vinylidene chloride and 5 to 30% by weight of acrylonitrile, plus about 0.1 to about 1% by weight of an organic polysiloxane, based on the weight of copolymer. The organic polysiloxane promotes adhesion between the polyvinyl alcohol base and the vinylidene chloride-acrylonitrile coating layer, and also improves the slip of the coated film.

Polyvinyl alcohol is a very desirable base material for packaging films because it has a low oxygen permeability as compared to other materials, such as regenerated cellulose, which are at present commonly used for packaging. Polyvinyl alcohol also has good tensile strength, elongation, tear strength, and bursting strength, and is readily shaped by conventional techniques using heat and vacuum. However, uncoated polyvinyl alcohol is not suitable for general use as a packaging film because the oxygen permeability of the material increases when the film is in a high humidity atmosphere. It is necessary to coat the polyvinyl alcohol base film with a material which will protect it from water vapor in the atmosphere, in order to preserve its oxygen barrier properties.

The coating layer in the film of this invention is a vinylidene chloride-acrylonitrile copolymer containing from 70 to 95% by weight of vinylidene chloride and conversely 5 to 30% by weight of acrylonitrile. Preferred copolymer compositions are those containing from about 75 to 90% by weight of vinylidene chloride and 10 to 25% by weight of acrylonitrile. An excellent coating composition is a copolymer of about 80% by weight of vinylidene chloride and about 20% by weight of acrylonitrile. This copolymer is commercially available under the trade name "Saran F-220" which is made and sold by the Dow Chemical Company, Midland, Michigan.

Copolymers of vinylidene chloride and acrylonitrile do not readily adhere to polyvinyl alcohol; hence it is necessary to use a small amount of an adhesion promoting agent in order to get a firm bond between the base and the coating layers. It has been found that about 0.1 to about 1% by weight of a polysiloxane, based on the weight of copolymer, provides excellent adhesion between the copolymer and the polyvinyl alcohol base. The discovery that a polysiloxane improves adhesion of the coating to the base layer is quite surprising since polysiloxanes generally inhibit adhesion of polymer laminates.

The polysiloxane adhesion promoting agent has the formula

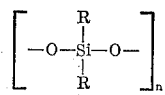

where R is selected from the group consisting of alkyl, alkenyl, and aryl radicals. Preferably the radicals denoted by R contain no more than about 8 carbon atoms. A preferred polysiloxane is poly(dimethylsiloxane), although other polysiloxanes such as poly(divinylsiloxane) and poly(diphenylsiloxane) may be used in lieu of poly (dimethylsiloxane). In addition to improving the adhesion of the vinylidene chloride-acrylonitrile copolymer to the polyvinyl alcohol base, the polysiloxane also improves the slip of the coated film.

While satisfactory results are obtained with amounts of polysiloxane ranging from about 0.1 to about 1%, best results are obtained when the amount of polysiloxane is in the range of about 0.15 to about 0.3%. The adherence of the copolymer to the base, although satisfactory, is not as good when the amount of polysiloxane is less than 0.15%. Amounts of polysiloxane in excess of about 0.3% impart an excessive cloudiness to the film and offer no particular advantages over smaller amounts in either adhesion or slip.

Films of this invention may be coated on either one side or both sides with the vinylidene chloride-acrylonitrile copolymers aforedescribed.

The coating can be applied to the polyvinyl alcohol base by any means known in the art. For example, the vinylidene chloride-acrylonitrile copolymer and the polysiloxane may both be dissolved in a suitable solvent such as methyl ethyl ketone, methyl isobutyl ketone, ethyl acetate, tetrahydrofuran, and the like. In addition, diluents such as toluene, ethylene chloride, and ethanol may be added if desired. The solution can then be applied to the surface of the polyvinyl alcohol using any standard coating machinery.

This invention will now be described with reference to specific embodiments thereof as illustrated by the following examples:

EXAMPLE 1

A thin transparent film of 99.9% hydrolyzed polyvinyl alcohol, plasticized with 4 parts by weight of glycerin per 100 parts of polyvinyl alcohol, having a thickness of approximately 0.0008 inch, was dried in a forced draft oven at 330° F. for approximately 30 seconds. A solution of 22% by weight of vinylidene chloride-acrylonitrile copolymer in methyl ethyl ketone was applied to one surface of the polyvinyl alcohol film by gravure coating. The copolymer a commercially available material sold under the trade name "Saran F-220," contained approximately 80% by weight of vinylidene chloride and 20% by weight of acrylonitrile, and had a viscosity of 200 centipoises in a 20% solution in methyl ethyl ketone. The solution also contained 0.2% by weight, based on the weight of copolymer, of poly(dimethylisiloxane) sold under the trade name "Viscasil 30,000" made by the General Electric Co., New York, New York, having a viscosity of approximately 30,000 centipoises. The coated polyvinyl alcohol film was then dried in a forced air oven at 330° F. for about 30 seconds. After drying, the coated film had a thickness of about 0.0009 inch. The polyvinyl alcohol was then coated on the other side in the same manner and dried. The coated film was transparent, and had an overall thickness of about 0.0010 inch.

The oxygen permeability of the film was determined. Oxygen permeability was measured by diffusion of oxygen through coated films from an essentially pure oxygen atmosphere to an oxygen-free atmosphere at 72° F. and relative humidities of 50% and 90%. The total pressure on each side of the film was one atmosphere. For purposes of comparison, the oxygen permeabilities of a film of uncoated polyvinyl alcohol 0.0008 inch thick and identical to the polyvinyl alcohol base layer of the coated film, and of a film of commercial coated regenerated cellulose, were also measured under the same conditions. The oxygen permeabilities, in cc./100 in.$^2$/day, are shown in Table I below:

*Table 1*

| Relative Humidity | Coated Polyvinyl Alcohol | Uncoated Polyvinyl Alcohol | Regenerated Cellulose |
| --- | --- | --- | --- |
| 50% | Less than 0.01 | 0.1 | 0.31 |
| 90% | Less than 0.01 | 3.3 | 0.51 |

Water vapor permeability was measured by passage of water through the film from a region of 100% relative humidity to a region of 50% relative humidity at 72° F. The water vapor permeability of the coated polyvinyl alcohol film of this invention was 0.3 gm./100 in.$^2$/day.

The coating layers were found to adhere satisfactorily to the base layer in adhesion tests. In one of these tests, a piece of adhesive cellophane tape was applied to the surface of the film and then pulled off quickly with no delamination. In the other test, two pieces of film were sealed together by the application of heat and pressure. After cooling, the two pieces were pulled apart. The seal was broken with only slight delamination in the vicinity of the seal and no delamination elsewhere.

EXAMPLES 2 THROUGH 9

A transparent film of 99.9% hydrolyzed polyvinyl alcohol, having a film thickness of 0.0008 inch was dried at 40° C. for 10 minutes. A 22% solution of a vinylidene chloride-acrylonitrile copolymer (approximately 80% by weight of vinylidene chloride and 20% by weight of acrylonitrile; viscosity of 200 centipoises at 25° C.) in methyl ethyl ketone was applied to one surface of the polyvinyl alcohol film. This solution also contained a small amount of poly(dimethylsiloxane), the amount and viscosity of which are indicated in Table II below. The solution was applied to the entire surface of film to be coated by means of a No. 20 wire-wound rod. The coated film was dried in an oven at 40° C. for 5 minutes, and then at 150° C. for 30 seconds. The dried coated film was removed from the oven, cooled, and conditioned in an atmosphere maintained at 72° F. and 50% relative humidity for 24 hours.

The polyvinyl alcohol film used in each of these examples, except Example 3, was a 99.9% hydrolyzed polyvinyl alcohol plasticized with 4 parts of glycerol per 100 parts of polyvinyl alcohol; the polyvinyl alcohol film used in Example 3 was 99.9% hydrolyzed polyvinyl alcohol plasticized with 10 parts of glycerol plus 5 parts of 1,3-butanediol per 100 parts of polyvinyl alcohol.

A control film was coated as described above except that the poly(dimethylsiloxane) was omitted.

Adhesion and slip in each of the coated films was measured. Adhesion was measured by the cellophane tape and heat seal tests as described in Example 1. Results of these tests, together with the amount and viscosity of poly(dimethylsiloxane) present, are shown in Table II below:

*Table II*

| Example | Poly(dimethylsiloxane) | | Adhesion | Slip |
| --- | --- | --- | --- | --- |
| | Amount, percent | Viscosity, cp. | | |
| 2 | 0.15 | 30,000 | S | G |
| 3 | 0.15 | 30,000 | S | G |
| 4 | 0.1 | 30,000 | S | F |
| 5 | 1 | 30,000 | S | E |
| 6 | 0.5 | 30,000 | S | E |
| 7 | 0.15 | 60,000 | S | G |
| 8 | 0.15 | 10,000 | S | G |
| 9 | 0.2 | 350 | S | P |
| Control | 0 | | P | VP |

The rating scale in the above table is as follows:

E=excellent    F=fair
G=good    P=poor
S=satisfactory    VP=very poor

Various modifications can be made by those of ordinary skill in the art. For example, the adherence of the coating layer to the polyvinyl alcohol base of film exposed to liquid water or high humidity for long periods of time is improved by applying a thin layer of a lower alkyl titanate such as isopropyl titanate between the base and coating layers as described in U.S. Patent No. 2,768,909. Films of this invention can be destaticized when desirable by passage through a dilute solution of a surface active agent such as glyceryl mono-oleate or sorbitan monostearate in either water or ethanol.

Application of a thin layer of a lower alkyl titanate to improve adhesion under extreme moisture conditions is illustrated by Example 10 below:

EXAMPLE 10

A thin coating of a 1% solution of tetraisopropyl titanate in methyl ethyl ketone, having a wet thickness of about 0.001 to 0.002 inch, was applied to both surfaces of a film of 99.9% hydrolyzed polyvinyl alcohol 0.0008 inch thick. The film was air dried, then oven dried at 40° C. for 5 minutes. A solution of a vinylidene chloride-acrylonitrile copolymer and poly(dimethylsiloxane) in methyl ethyl ketone identical to the solution described in Example 1 was applied to the surfaces of the film and the coated film oven-dried as described in Example 2.

Strips of film coated as described in this example were immersed in water at room temperature for 48 hours and examined periodically. At the end of the time, these film strips showed no loss of adhesion. Film strips of polyvinyl alcohol having a coating layer of vinylidene chloride-acrylonitrile copolymer containing 0.2% poly(dimethylsiloxane) as described in this example applied directly to the polyvinyl alcohol base were also immersed in water at room temperature. These strips showed no loss of adhesion after 24 hours but showed some signs of delamination after 48 hours. Strips of the control film of Examples 2 to 9, consisting of vinylidene chloride-acrylonitrile copolymer containing no poly(dimethylsiloxane) applied directly to the polyvinyl alcohol base layer, were almost completely delaminated after 24 hours.

While this invention has been described with reference to various specific embodiments thereof, these embodiments are for purpose of illustration and not limitation.

I claim:

1. A coated film comprising a polyvinyl alcohol base sheet coated on at least one side with a copolymer of 70 to 95% vinylidene chloride and 5 to 30% acrylonitrile containing from about 0.1 to 1% of a hydrocarbon-substituted polysiloxane based on the weight of said copolymer.

2. A coated film according to claim 1 in which the amount of hydrocarbon-substituted polysiloxane is in the range of 0.15 to 0.3% based on the weight of said copolymer.

3. A coated film according to claim 1 in which the hydrocarbon-substituted polysiloxane is poly(dimethylsiloxane).

4. A process for preparing a coated film which comprises applying to a polyvinyl alcohol base film a solution of a copolymer of about 75 to 90% vinylidene chloride and 10 to 25% acrylonitrile, said solution also containing from 0.1 to 1% of a hydrocarbon-substituted polysiloxane based on the weight of said copolymer and drying the coated film.

5. A process according to claim 4 in which the amount of hydrocarbon-substituted polysiloxane is in the range of 0.15 to 0.3% based on the weight of said copolymer.

6. A process according to claim 4 in which the hydrocarbon-substituted polysiloxane is poly(dimethylsiloxane).

7. A coated film comprising a polyvinyl alcohol base sheet coated on at least one side with a copolymer of 75 to 90% vinylidene chloride and 5 to 30% acrylonitrile containing from about 0.1 to 1% of a hydrocarbon-substituted polysiloxane based on the weight of said copolymer.

8. A coated film according to claim 7, in which the amount of hydrocarbon-substituted polysiloxane is in the range of 0.15 to 0.3% based on the weight of said copolymer.

9. A coated film according to claim 7, in which the hydrocarbon-substituted polysiloxane is poly(dimethylsiloxane).

10. A coated film comprising a polyvinyl alcohol base sheet coated on at least one side with a copolymer of 70 to 95% vinylidene chloride and 5 to 30% acrylonitrile containing from about 0.1 to 1% of a hydrocarbon-substituted polysiloxane based on the weight of said copolymer, said polysiloxane having a viscosity of at most 30,000 centipoises.

11. A coated film according to claim 10, in which the amount of hydrocarbon-substituted polysiloxane is in the range of 0.15 to 0.3% based on the weight of copolymer.

12. A coated film comprising a polyvinyl alcohol base sheet coated on at least one side with a copolymer of about 80% vinylidene chloride and about 20% acrylonitrile containing from about 0.1 to 1% of a hydrocarbon-substituted polysiloxane based on the weight of said copolymer.

13. A coated film according to claim 1 in which the amount of hydrocarbon-substituted polysiloxane is in the range of 0.15 to 0.3% based on the weight of said copolymer, and in which the hydrocarbon-substituted polysiloxane is poly(dimethylsiloxane).

14. A coated film comprising a polyvinyl alcohol base sheet coated on at least one side with a copolymer of about 80% vinylidene chloride and about 20% acrylonitrile containing from about 0.1 to 1% of a hydrocarbon-substituted polysiloxane based on the weight of said copolymer, said polysiloxane having a viscosity of at most 30,000 centipoises.

15. A coated film according to claim 1 in which the amount of hydrocarbon-substituted polysiloxane is in the range of 0.15 to 0.3% based on the weight of said copolymer, and in which the hydrocarbon-substituted polysiloxane is poly(dimethylsiloxane), said polysiloxane having a viscosity of at most 30,000 centipoises.

16. A process for preparing a coated film which comprises applying to a polyvinyl alcohol base film a solution of a copolymer of about 80% vinylidene chloride and about 20% acrylonitrile, said solution also containing from 0.1 to 1% of a hydrocarbon-substituted polysiloxane based on the weight of said copolymer, and drying the coated film, said polysiloxane having a viscosity of at most 30,000 centipoises.

17. A process according to claim 16, in which the amount of hydrocarbon-substituted polysiloxane is in the range of 0.15 to 0.3% based on the weight of copolymer.

18. A process according to claim 16, in which the amount of hydrocarbon-substituted polysiloxane is in the range of 0.15 to 0.3% by weight based on the weight of copolymer, and in which the hydrocarbon-substituted polysiloxane is poly(dimethylsiloxane).

References Cited by the Examiner
UNITED STATES PATENTS

| | | | |
|---|---|---|---|
| 2,884,388 | 4/59 | Hedlund | 260—45.5 |
| 2,990,391 | 6/61 | Grantham. | |

RICHARD D. NEVIUS, *Primary Examiner.*